United States Patent
Keating et al.

(10) Patent No.: US 9,359,976 B2
(45) Date of Patent: Jun. 7, 2016

(54) ENGINE WITH PULSE-SUPPRESSED DEDICATED EXHAUST GAS RECIRCULATION

(71) Applicant: GM GLOBAL TECHNOLOGY OPERATIONS LLC, Detroit, MI (US)

(72) Inventors: Edward J. Keating, Ortonville, MI (US); Rodney E. Baker, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 156 days.

(21) Appl. No.: 13/869,313

(22) Filed: Apr. 24, 2013

(65) Prior Publication Data
US 2014/0318121 A1    Oct. 30, 2014

(51) Int. Cl.
| | | |
|---|---|---|
| F02B 47/08 | (2006.01) | |
| F02M 25/07 | (2006.01) | |
| F02B 33/00 | (2006.01) | |
| F02B 33/44 | (2006.01) | |
| F02M 35/10 | (2006.01) | |
| F02B 29/04 | (2006.01) | |

(52) U.S. Cl.
CPC ........ *F02M 25/0735* (2013.01); *F02B 29/0475* (2013.01); *F02M 25/0706* (2013.01); *F02M 25/0707* (2013.01); *F02M 25/0749* (2013.01); *F02M 35/10295* (2013.01); *Y02T 10/121* (2013.01); *Y02T 10/146* (2013.01)

(58) Field of Classification Search
CPC ........................ F02M 25/0707; F02M 25/0713
USPC ........... 60/605.2; 123/568.22, 568.17, 568.11
See application file for complete search history.

(56) References Cited

U.S. PATENT DOCUMENTS

| | | | | |
|---|---|---|---|---|
| 4,249,382 | A * | 2/1981 | Evans et al. | 60/605.2 |
| 5,517,976 | A * | 5/1996 | Bachle et al. | 123/568.11 |
| 6,293,264 | B1 * | 9/2001 | Middlebrook | 123/563 |
| 6,324,847 | B1 * | 12/2001 | Pierpont | 60/605.2 |
| 7,444,815 | B2 * | 11/2008 | Baumgard et al. | 60/605.2 |
| 7,945,376 | B2 * | 5/2011 | Geyer et al. | 701/108 |
| 8,561,599 | B2 * | 10/2013 | Gingrich et al. | 123/568.17 |

(Continued)

FOREIGN PATENT DOCUMENTS

DE    10002482 A1 *    7/2001    ............ F02B 29/0493

OTHER PUBLICATIONS

DE 10002482 A1 Englsih Translation.*

(Continued)

*Primary Examiner* — Thomas Denion
*Assistant Examiner* — Jessica Kebea
(74) *Attorney, Agent, or Firm* — Quinn Law Group, PLLC

(57) ABSTRACT

An engine assembly includes an intake assembly, a spark-ignited internal combustion engine, and an exhaust assembly. The intake assembly includes a charge air cooler disposed between an exhaust gas recirculation (EGR) mixer and a backpressure valve. The charge air cooler has both an inlet and an outlet, and the back pressure valve is configured to maintain a minimum pressure difference between the inlet of the charge air cooler and an outlet of the backpressure valve. A dedicated exhaust gas recirculation system is provided in fluid communication with at least one cylinder and with the EGR mixer. The dedicated exhaust gas recirculation system is configured to route all of the exhaust gas from the at least one cylinder to the EGR mixer for recirculation back to the engine.

10 Claims, 2 Drawing Sheets

(56) References Cited

U.S. PATENT DOCUMENTS

| | | | |
|---|---|---|---|
| 2006/0112940 A1* | 6/2006 | Roberts et al. | 123/568.11 |
| 2007/0039597 A1* | 2/2007 | Zukouski | 123/568.17 |
| 2009/0308070 A1* | 12/2009 | Alger et al. | 60/602 |
| 2010/0050999 A1* | 3/2010 | Murata et al. | 123/568.11 |
| 2011/0041495 A1* | 2/2011 | Yager | 60/605.2 |
| 2012/0204845 A1* | 8/2012 | Gingrich et al. | 123/568.17 |
| 2015/0260128 A1* | 9/2015 | Roth | F02M 25/0709 123/568.13 |

OTHER PUBLICATIONS

DE 10002482 A1 English Translation.*

* cited by examiner

US 9,359,976 B2

ENGINE WITH PULSE-SUPPRESSED DEDICATED EXHAUST GAS RECIRCULATION

STATEMENT REGARDING FEDERALLY SPONSORED RESEARCH OR DEVELOPMENT

This invention was made with government support under DOE/NETL grant number DE-EE0005654. The invention described herein may be manufactured and used by or for the U.S. Government for U.S. Government (i.e., non-commercial) purposes without the payment of royalties thereon or therefore.

TECHNICAL FIELD

The present invention relates generally to turbocharged internal combustion engines with dedicated exhaust gas recirculation.

BACKGROUND

Internal combustion engines (ICE) may combust a mixture of air and fuel within one or more combustion chambers to produce a mechanical output. During the combustion, various exhaust gases are produced and expelled to the atmosphere. In some instances, a portion of the exhaust gas may be recirculated back into the engine cylinders (via an exhaust gas recirculation system). In a gasoline engine, this inert exhaust may displace an amount of combustible mixture in the cylinder resulting in increased engine efficiency. In a diesel engine, the exhaust gas may replace some of the excess oxygen in the pre-combustion mixture. In either instance, the recirculated exhaust may reduce the combustion temperature in the cylinder and/or reduce the creation of certain gaseous byproducts.

Internal combustion engines are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger includes a central shaft that is supported by one or more bearings and that transmits rotational motion between an exhaust-driven turbine wheel and an air compressor wheel. Both the turbine and compressor wheels are fixed to the shaft, which in combination with various bearing components constitute the turbocharger's rotating assembly.

SUMMARY

An engine assembly includes an intake assembly, a spark-ignited internal combustion engine, and an exhaust assembly. The intake assembly includes a charge air cooler disposed between an exhaust gas recirculation (EGR) mixer and a backpressure valve. The charge air cooler has both an inlet and an outlet, and the back pressure valve is configured to maintain a minimum pressure difference between the inlet of the charge air cooler and an outlet of the backpressure valve.

A dedicated exhaust gas recirculation system is provided in fluid communication with at least one cylinder and with the EGR mixer. The dedicated exhaust gas recirculation system is configured to route all of the exhaust gas from the at least one cylinder to the EGR mixer for recirculation back to the engine.

The intake assembly may provide air to each of the plurality of cylinders at a desired flow rate. The provided air may include both atmospheric air and the recirculated exhaust gas from the dedicated exhaust gas recirculation system. The exhaust gas may include a pressure pulse that may be attributable to the sequential firing nature of the internal combustion engine. The charge air cooler may be configured to dampen the exhaust pulse if the flow rate is above a predetermined rate, while the backpressure valve may be configured to dampen the pulse if the flow rate is below the predetermined rate.

The engine assembly may further include a turbocharger having a compressor in fluid communication with the intake assembly and a turbine in fluid communication with the exhaust assembly. The compressor and turbine may be operatively connected through a shaft such that the turbine may drive the compressor to compress the atmospheric air prior to mixing with the recirculated exhaust gas.

The above features and advantages and other features and advantages of the present invention are readily apparent from the following detailed description of the best modes for carrying out the invention when taken in connection with the accompanying drawings.

DETAILED DESCRIPTION

Figure 1:
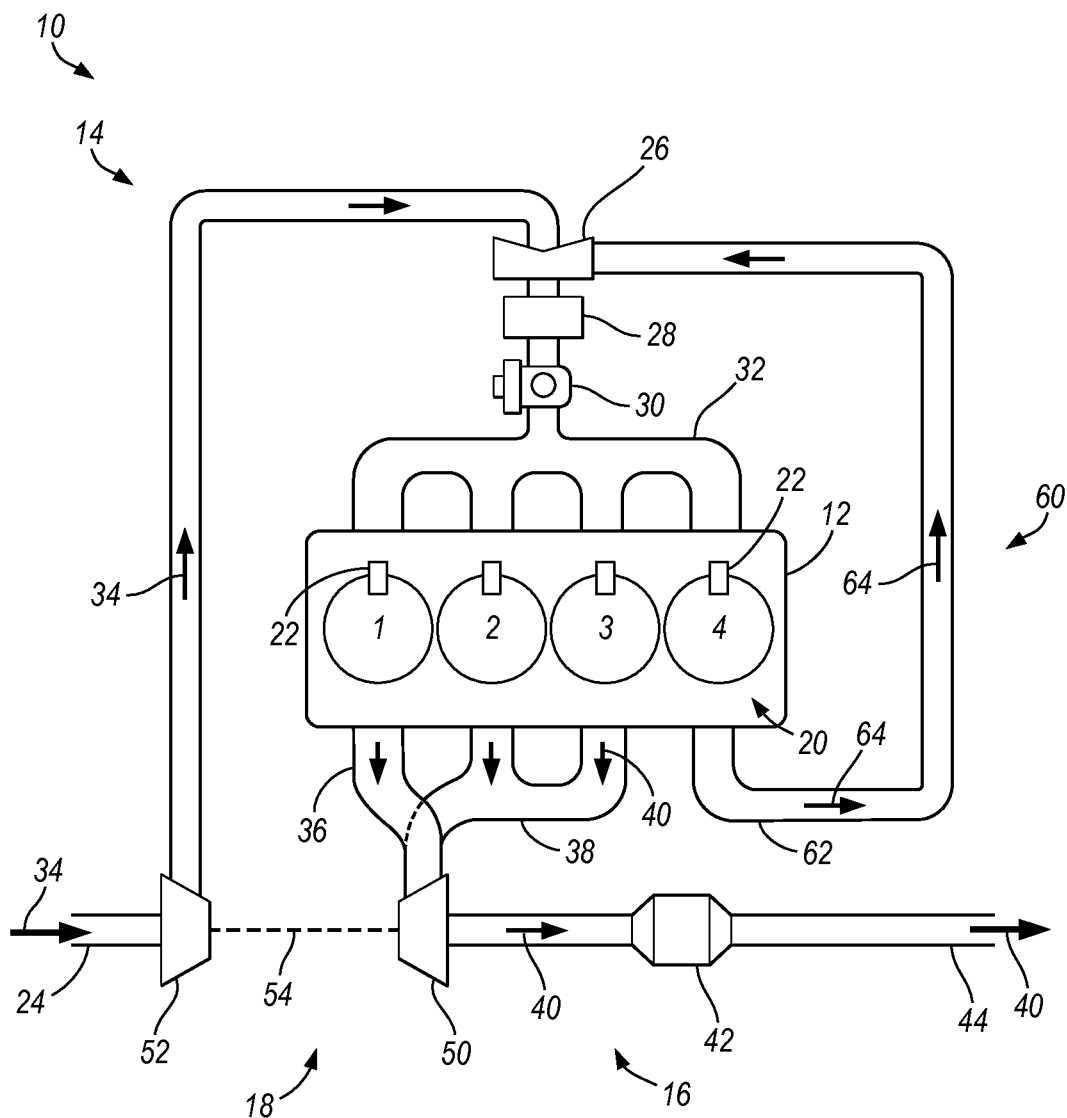
FIG. 1 is a schematic diagram of an internal combustion engine assembly with a dedicated exhaust gas recirculation.

Referring to the drawings, wherein like reference numerals are used to identify like or identical components in the various views, FIG. 1 schematically illustrates an engine assembly 10 including an internal combustion engine 12, an air intake system 14, and an exhaust system 16. The air intake system 14 and the exhaust system 16 may each respectively be in fluid communication with the engine 12, and may be in mechanical communication with each other through a turbocharger 18.

The internal combustion engine 12 (i.e., engine 12) may be a spark-ignited internal combustion engine or a combustion-ignited diesel engine, and may define a plurality of cylinders 20 (referenced as cylinders 1-4). Each of the respective cylinders 20 may include one or more fuel injectors 22 that may selectively introduce liquid fuel (as an aerosol) into each cylinder for combustion. Each of the cylinders 20 may be in selective fluid communication with the air intake system 14 to receive fresh/oxygenated air, and several of the cylinders 20 may be in selective fluid communication with the exhaust system 16 to expel the byproducts of combustion. While the illustrated engine 12 depicts a 4-cylinder engine, the present technology is equally applicable to inline three and six cylinder engines, V-8, V-10, and V-12 configuration engines, among others.

The air intake system 14 may generally include a fresh-air inlet 24, an exhaust gas recirculation (EGR) mixer 26, a charge air cooler 28, a throttle 30, and an intake manifold 32. As may be appreciated during operation of the engine 12 fresh air 34 may be ingested by the air intake system 14 from the atmosphere (or from an associated air-cleaner assembly) via the fresh-air inlet 24. The throttle 30 may include a controllable baffle configured to selectively regulate the total flow of air through the intake system 14, and ultimately into the cylinders 20 (via the intake manifold 32).

In a typical 4-cylinder engine, combustion in the various engine cylinders 20 may occur in a sequential manner. For example, the firing order may sequentially be: cylinder 1; cylinder 3; cylinder 4; cylinder 2. As may be appreciated, the engine 12 may then expel gas from the cylinders in the same sequential order; and thus, the exhaust flow may more closely resemble a series of pulses than a continuous flow.

It has been found that engine efficiency is maximized when exhaust pulses are separated from each other. In addition to reducing interference between the pulses, the separation may reduce the occurrence of knocking and/or abnormal combustion. In an effort to achieve sufficient pulse separation, the exhaust flow may be divided into different flows, which may be separately routed to the turbocharger 18 via multiple exhaust manifolds. Therefore, in one configuration, the exhaust system 16 may include a first exhaust manifold 36 and a second exhaust manifold 38 that may channel flowing exhaust gasses 40 away from the engine 12. The exhaust gasses 40 may eventually pass through an aftertreatment device 42 to catalyze and/or remove certain byproducts prior to exiting the exhaust system 16 via a tailpipe 44.

As mentioned above, the air intake system 14 and the exhaust system 16 may be in mechanical communication through a turbocharger 18. The turbocharger 18 may include a turbine 50 in fluid communication with the exhaust system 16 and a compressor 52 in fluid communication with the intake system 14. The turbine 50 and the compressor 52 may be mechanically coupled via a rotatable shaft 54. The turbocharger 18 may utilize the energy of exhaust gasses 40 flowing from the engine 12 to spin the turbine 50 and compressor 52. The rotation of the compressor 52 may then draw fresh air 34 in from the inlet 24 and compress it into the remainder of the intake system 14.

The engine assembly 10 may further include a dedicated EGR system 60 that may directly route (e.g., via an EGR manifold 62) the exhaust gas 64 from one or more cylinders of the engine 12 back into the intake system 14. This recirculated exhaust gas 64 may mix with the fresh air 34 at the EGR mixer 26, and may correspondingly dilute the oxygen content of the mixture. The use of EGR is known to increase efficiency in spark ignition engines. EGR is also known to reduce the combustion temperature and NOx production from the engine 12. Using a separate EGR manifold 62 to route the entire exhaust of one or more cylinders back to the intake assembly 14 is referred to herein as "dedicated EGR."

With continued reference to FIG. 1, one of the cylinders 20 (i.e., cylinder 4) is a dedicated EGR cylinder that may supply 100% of its exhaust gas 64 back to the intake assembly 14. The exhaust gas 40 of the remaining three cylinders 20 (i.e., cylinders 1-3) is expelled from the engine 12 via the exhaust assembly 16.

In a similar manner as cylinders 1-3, the dedicated EGR cylinder 4 may likewise expel combustion gasses in a pulsed manner. While an engine operating with dedicated EGR may exhibit an increase in fuel efficiency, the full benefit may not be available if the recirculated exhaust gas 64 does not properly mix with the intake air 34. For example, if 80% of the available exhaust gas was drawn exclusively into cylinder 3 (e.g., due to the timing of the intake and pulsing of the exhaust) then the benefits of the EGR to cylinders 1, 2, and 4 would be greatly reduced. Similarly the performance of cylinder 3 would be noticeably reduced due to the comparatively low amount of combustible air/fuel in that cylinder.

Figure 2:
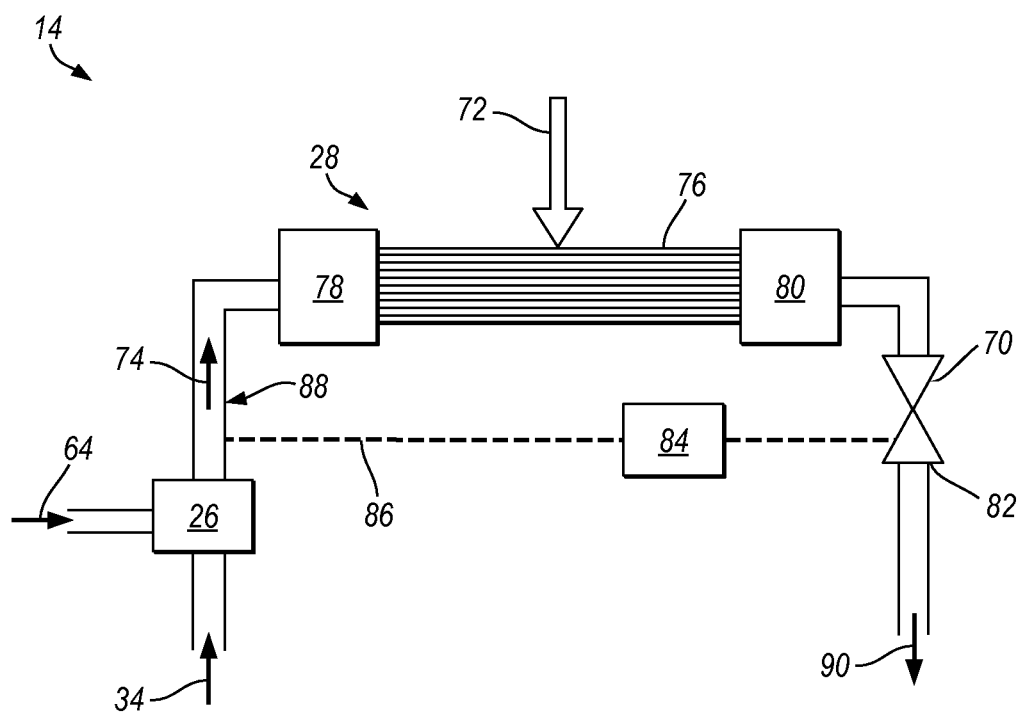
FIG. 2 is a schematic diagram of an air intake system including an exhaust gas recirculation mixer, a charge air cooler, and a backpressure valve.

Therefore, as generally shown in FIG. 2, the charge air cooler 28 may be disposed between the EGR mixer 26 and a backpressure valve 70 to suppress/dampen the pulsing of the recirculated exhaust gas 64 across all flow rates. In general, the charge air cooler 28 may be a radiator-style heat exchanger that may use a flow of atmospheric air 72 or liquid coolant to cool the fresh air/exhaust gas mixture 74. As may be appreciated, the gas mixture 74 may be warmer than atmospheric temperature due to the pressurization via the compressor 52, along with the mixing of the high-temperature exhaust gasses 64. The charge air cooler 28 may cool the gas mixture 74 to increase its density/volumetric efficiency, while also reducing the potential for abnormal combustion.

The charge air cooler 28 may include a plurality of closed cooling passageways 76 that fluidly couple an inlet volume 78 with an outlet volume 80. The cooling passageways 76 may be formed from a thermally conductive material, such as aluminum, and may further include a plurality of heat transfer features, such as fins or wires, that may promote heat transfer between the externally flowing atmospheric air or liquid coolant 72 and the internally contained gas mixture 74.

During high flow rate scenarios where a substantial amount of the gas mixture 74 is being drawn into the engine 12, the inlet volume 78 and cooling passageways 76 of the charge air cooler 28 may act as a gas dampener to reduce the pulsing of the recirculated exhaust gas 64. This dampening may occur due to acoustic and/or flow impedance effects.

Specifically with respect to the charge air cooler 28, due to the reduced cross-sectional area of the cooling passageways 76 (as compared to the inlet volume 78) flow impedance is established and acoustic tuning effects are created. These flow impedance and acoustic tuning effects may serve to dampen the exhaust pulses that are provided upstream of the charge air cooler 28 to create a more uniform flow downstream (i.e., on the engine-side). If the upstream flow rate is below the rate where the flow impedance and acoustic tuning are effective, however, the charge air cooler 28 may unfortunately lose the ability to dampen the exhaust pulses.

To dampen the exhaust pulses at low flow, the air intake system 14 may include a backpressure valve 70 disposed between the charge air cooler 28 and the engine 12. The backpressure valve 70 may be operative to ensure a minimum pressure difference between a reference pressure and a pressure at the outlet 82 of the valve 70.

The backpressure valve 70 may include, or be in communication with an actuator 84 configured to modulate the valve 70 as a function of a monitored pressure differential. In one configuration, the actuator 84 may be in communication (e.g., via signal line 86) with an inlet 88 of the charge air cooler 28, which may serve as the reference pressure. If the pressure difference between the inlet 88 of the charge air cooler 28 and the outlet 82 of the valve 70 is below a predetermined amount, the actuator 84 may close the valve 70 to increase the pressure difference. Once the pressure difference exceeds the minimum allowable pressure difference, the actuator 84 may modulate the valve 70 while allowing the cooled gas mixture 90 to flow to the cylinders 20. In one configuration, the minimum allowable pressure difference may be in the range of 2 kPa-10 kPa.

During operation at high flow rates, the flow may result in a pressure buildup proximate the inlet 78 of the charge air cooler 28. As such, the pressure difference between the inlet 78 of the charge air cooler 28 and the outlet 82 of the valve 70 may exceed the minimum allowable pressure difference, and the valve 70 may be fully open (i.e., provide no or minimal flow restriction). If the flow rate should drop to a point where 100% of the flow is freely passing through the cooling passageways 76, the pressure at the inlet 78 of the charge air cooler 28 may drop to a level where damping does not occur. In response to this pressure drop at the inlet volume 78, the backpressure valve 70 may close until the desired pressure at the inlet is re-achieved difference (i.e., between the inlet 78 of the charge air cooler 28 and the throttle 30/cylinders 20).

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. An engine assembly comprising:
    an intake assembly including an exhaust gas recirculation (EGR) mixer and a charge air cooler having an inlet and an outlet, the EGR mixer being coupled with the inlet of the charge air cooler;
    a spark-ignited internal combustion engine defining a plurality of cylinders and configured to combust a fuel;
    wherein each of the plurality of cylinders are coupled with the outlet of the charge air cooler;
    wherein combustion of the fuel occurs within the plurality of cylinders and produces an exhaust gas;
    an exhaust assembly in fluid communication with a first subset of the plurality of cylinders;
    a dedicated exhaust gas recirculation system in fluid communication with a second subset of the plurality of cylinders and with the EGR mixer, the dedicated exhaust gas recirculation system being configured to route all of the exhaust gas from the second subset of the plurality of cylinders to the EGR mixer; and
    a backpressure valve disposed between the outlet of the charge air cooler and the plurality of cylinders, wherein the backpressure valve includes an actuator in communication with the inlet of the charge air cooler, wherein the actuator is configured to monitor a pressure difference between the inlet of the charge air cooler and an outlet of the backpressure valve, and to modulate the back pressure valve to maintain the monitored pressure difference above a minimum pressure difference;
    wherein the intake assembly provides air to each of the plurality of cylinders at a flow rate;
    wherein the provided air includes both atmospheric air and the exhaust gas from the second subset of the plurality of cylinders;
    wherein the exhaust gas from the second subset of the plurality of cylinders includes a pressure pulse;
    wherein the charge air cooler is configured to dampen the pulse if the flow rate is above a predetermined rate; and
    wherein the backpressure valve is configured to dampen the pulse in conjunction with the charge air cooler if the flow rate is below the predetermined rate.

2. The engine assembly of claim 1, further comprising a turbocharger including:
    a compressor in fluid communication with the intake assembly;
    a turbine in fluid communication with the exhaust assembly; and
    wherein the compressor and turbine are operatively connected through a shaft.

3. The engine assembly of claim 1, wherein the charge air cooler is disposed between the EGR mixer and the backpressure valve.

4. The engine assembly of claim 1, wherein the intake assembly further includes a throttle.

5. An engine assembly comprising:
    an intake assembly including a charge air cooler disposed between an exhaust gas recirculation (EGR) mixer and a backpressure valve, the charge air cooler having an inlet and an outlet,
    wherein the backpressure valve includes an actuator in communication with the inlet of the charge air cooler, wherein the actuator is configured to monitor a pressure difference between the inlet of the charge air cooler and an outlet of the backpressure valve, and to modulate the back pressure valve to maintain the monitored pressure difference above a minimum pressure difference;
    a spark-ignited internal combustion engine defining a plurality of cylinders and configured to combust a fuel;
    wherein each of the plurality of cylinders are coupled with the outlet of the charge air cooler;
    wherein combustion of the fuel occurs within the plurality of cylinders and produces an exhaust gas;
    an exhaust assembly in fluid communication with a first subset of the plurality of cylinders; and
    a dedicated exhaust gas recirculation system in fluid communication with a second subset of the plurality of cylinders and with the EGR mixer, the dedicated exhaust gas recirculation system being configured to route all of the exhaust gas from the second subset of the plurality of cylinders to the EGR mixer;
    wherein the intake assembly provides air to each of the plurality of cylinders at a flow rate;
    wherein the provided air includes both atmospheric air and the exhaust gas from the second subset of the plurality of cylinders;
    wherein the exhaust gas from the second subset of the plurality of cylinders includes a pressure pulse;
    wherein the charge air cooler is configured to dampen the pulse if the flow rate is above a predetermined rate; and
    wherein the backpressure valve is configured to dampen the pulse in conjunction with the charge air cooler if the flow rate is below the predetermined rate.

6. The engine assembly of claim 5, further comprising a turbocharger including:
    a compressor in fluid communication with the intake assembly;
    a turbine in fluid communication with the exhaust assembly; and
    wherein the compressor and turbine are operatively connected through a shaft.

7. The engine assembly of claim 5, wherein the intake assembly further includes a throttle.

8. An engine assembly comprising:
    an intake assembly including a charge air cooler disposed between an exhaust gas recirculation (EGR) mixer and a backpressure valve, the charge air cooler having an inlet and an outlet, wherein the back pressure valve includes an actuator in communication with the inlet of the charge air cooler, and wherein the actuator is configured to monitor a pressure difference between the inlet of the charge air cooler and an outlet of the backpressure valve, and to modulate the back pressure valve to maintain the monitored pressure difference above a minimum pressure difference;
    a spark-ignited internal combustion engine defining a plurality of cylinders and configured to combust a fuel;

wherein each of the plurality of cylinders are coupled with the outlet of the charge air cooler;

wherein combustion of the fuel occurs within the plurality of cylinders and produces an exhaust gas;

an exhaust assembly in fluid communication with a first subset of the plurality of cylinders;

a dedicated exhaust gas recirculation system in fluid communication with a second subset of the plurality of cylinders and with the EGR mixer, the dedicated exhaust gas recirculation system being configured to route all of the exhaust gas from the second subset of the plurality of cylinders to the EGR mixer;

wherein the exhaust gas from the second subset of the plurality of cylinders includes a pressure pulse;

wherein the intake assembly provides air to each of the plurality of cylinders at a flow rate;

wherein the provided air includes both atmospheric air and the exhaust gas from the second subset of the plurality of cylinders;

wherein the charge air cooler is configured to dampen the pulse if the flow rate is above a predetermined rate; and wherein the backpressure valve is configured to dampen the pulse in conjunction with the charge air cooler if the flow rate is below the predetermined rate.

9. The engine assembly of claim 8, further comprising a turbocharger including:

a compressor in fluid communication with the intake assembly;

a turbine in fluid communication with the exhaust assembly; and wherein the compressor and turbine are operatively connected through a shaft.

10. The engine assembly of claim 8, wherein the intake assembly further includes a throttle.

* * * * *